Jan. 7, 1958 L. E. THOMPSON 2,819,344

FREQUENCY DIVISION MULTIPLEXING

Filed July 28, 1952 4 Sheets-Sheet 1

INVENTOR.
LELAND E. THOMPSON

BY Charles H. Brown

ATTORNEY

INVENTOR.
LELAND E. THOMPSON
BY Charles H. Brown
ATTORNEY

Jan. 7, 1958 L. E. THOMPSON 2,819,344

FREQUENCY DIVISION MULTIPLEXING

Filed July 28, 1952 4 Sheets-Sheet 3

INVENTOR.
LELAND E. THOMPSON

BY Charles H. Brown

ATTORNEY

Jan. 7, 1958 L. E. THOMPSON 2,819,344

FREQUENCY DIVISION MULTIPLEXING

Filed July 28, 1952 4 Sheets-Sheet 4

INVENTOR.
LELAND E. THOMPSON

BY Charles H. Brown
ATTORNEY 2,819,344
Patented Jan. 7, 1958

2,819,344

FREQUENCY DIVISION MULTIPLEXING

Leland E. Thompson, Merchantville, N. J., assignor to Radio Corporation of America, a corporation of Delaware Application July 28, 1952, Serial No. 301,182
6 Claims. (Cl. 179—15)

This invention relates to a frequency-division multiplex system, and more particularly to terminal channeling systems which perform a translation between a plurality of message (e. g., audio-frequency) signals of a given frequency range and a composite signal wherein the intelligence of each of the message signals is carried by a frequency band separated from others.

In the communications field it is often desirable to employ a wide-band transmssion line or radio circuit for the simultaneous transmission or reception of a plurality of voice signals. A transmission line or radio circuit capable of handling a frequency range of 100 kilocycles, for example, can be divided up into frequency channels for the simultaneous transmission of twenty voice signals, each five kilocycles wide.

In the translation of a plurality of audio-frequency signals into a plurality of channel frequency signals each separated from the others, it has been necessary to employ a considerable number of expensive filters to insure against interference between channels. The prior art channeling systems use, for each channel frequency signal, filters that are specifically designed and constructed for that particular channel. Consequently, a considerable number of different filters have been required in a frequency division multiplexing installation. It is therefore a primary object of this invention to eliminate the need for different filters for the different channels and to provide a channeling system characterized by simplicity of construction and economy of manufacture combined with improved performance.

It is another object to provide a channeling system wherein a minimum number of different components are employed, for the simplification of manufacture and maintenance.

It is a further object to provide a channeling system affording great operating flexibility in that each voice channel equipment is the same as the others except for the frequency of one of its crystal oscillators.

It is a further object to provide selective calling on each channel by means of multiple calling equipments which are identical for all channels.

According to one aspect, the present invention comprises a plurality of transmit-receive channel equipments coupled to transmitting means and receiving means. Each transmit-receive channel equipment comprises a balanced modulator wherein the output of a first oscillator is modulated by the voice signal, a transmitting band-pass filter which passes only one of the resulting side bands, a transmitting mixer receptive of the passed side band and the output of a second oscillator, and a transmitting low-pass filter for passing only the difference frequencies to the transmitting means. The process is reversed in reception. A signal from the receiving means is passed through a receiving low-pass filter, identical to the transmitting low-pass filter, to a receiving mixer. The signal is there mixed with the output of the second oscillator and the lower side band is passed by a receiving band-pass filter identical to the transmitting band-pass filter. The lower side band is then mixed with the output of the first oscillator and the resulting signal used to operate a utilization means, such as a speaker.

A feature of the invention is the circuit design involving the use of a first oscillator having an output frequency which is higher than the highest channel frequency in the composite signal. As a result of this design, all the first oscillators, all the balanced modulators, all the band-pass filters, and all the low-pass filters may be substantially identical in construction and operation, with the attendant advantages in manufacture and maintenance. The various transmit-receive channel equipments differ only in the output frequencies of the second oscillators.

According to a further development of the invention, identical calling equipments are provided for each channel and selectivity is achieved by heterodyning the call signals with oscillators in each channel, the oscillator frequency in each channel being different.

These and other objects, features and aspects of the invention can be better understood by reference to the following detailed description, in connection with the drawings, wherein.

Figure 1:
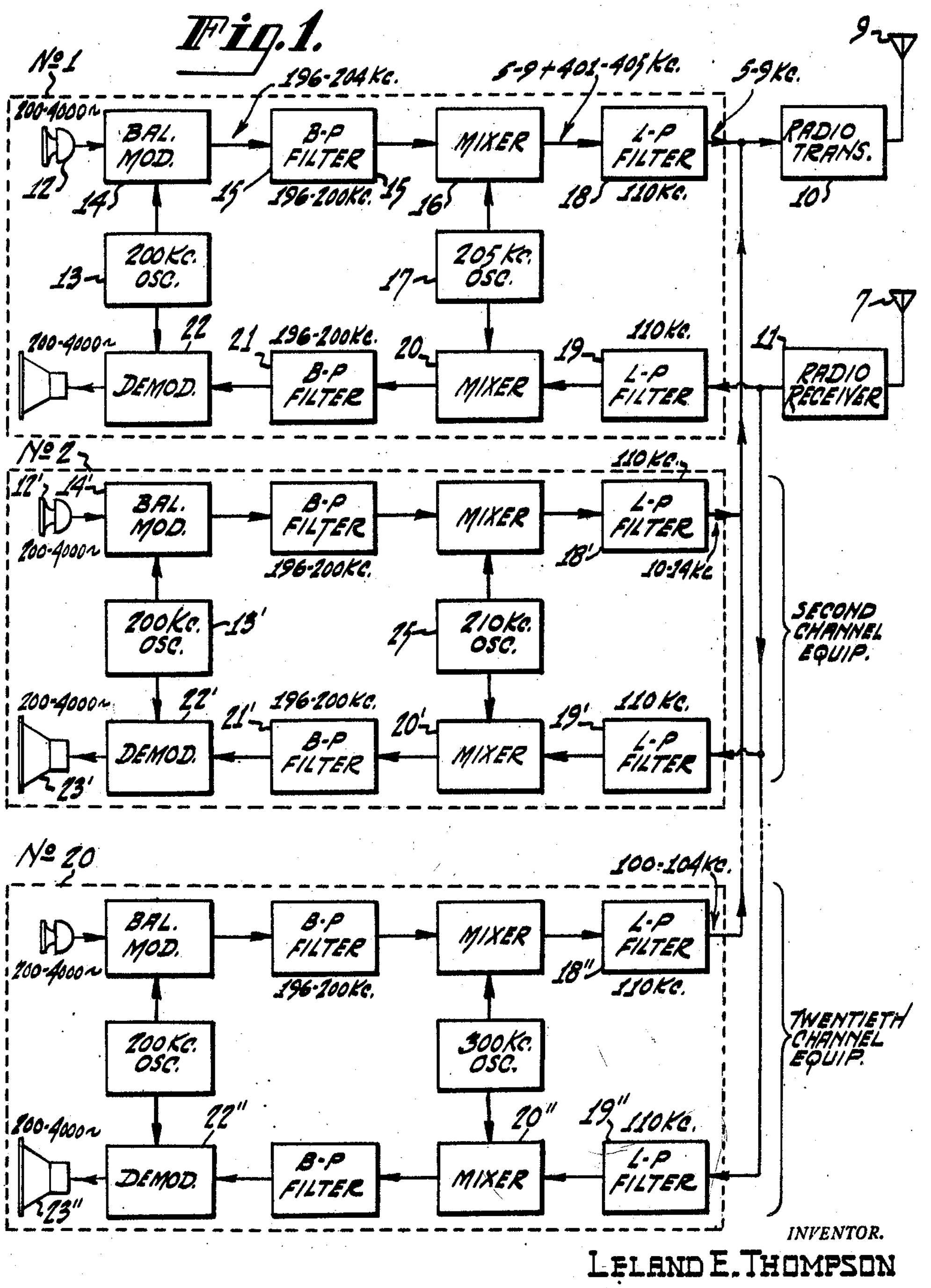
Fig. 1 is a block diagram of the terminal equipment of a frequency-division multiplex system constructed according to the teachings of this invention.

Referring now in greater detail to the drawings, Fig. 1 illustrates one of the two similar but widely spaced terminals in communication with each other and constituting the freqeuncy division multiplex system of the invention. In Fig. 1 a transmit-receive terminal for a plurality of channels 1, 2–20, shown in dotted lines boxes is represented in block diagram form. The arrows designate the directions of energy flow from block to block. A common radio transmitter 10 and a common radio receiver 11 are used in the transmission and reception of a signal associated with the twenty transmit-receive channel equipments. Only the first, second and last channel equipments have been shown, the other channel equipments being omitted from the drawing in the interest of simplicity of illustration. The same equipments in the different channels have been given the same reference numerals except for the prime designations. In the first channel, No. 1, an audio-frequency signal from microphone 12 is used to modulate the output of a 200-kilocycle oscillator 13 in balanced modulator 14. Microphone 12 may pass speech in the frequency range of 200 to 4,000 cycles. The specific frequencies mentioned herein are given by way of example for the purpose of clarity in the description. Other frequencies may be used provided that certain relationships are maintained. The input and output signals may be other than audio-frequency signals, if desired. It is important that the frequency of oscillator 13 be higher than the highest frequency in the composite signal applied from the various channels to radio transmitter 10. Transmitting band-pass filter 15 passes one of the side bands in the output of modulator 14; in this example, the difference frequencies, 196–200 kilocycles are passed to a transmitting mixer 16. The system can be designed to employ the upper side band, or both side bands, if desired. The output of a 205-kilocycle oscillator 17 is also applied to mixer 16, with the result that the output of mixer 16 includes frequencies between 5 and 9 kilocycles and between 401 and 405 kilocycles. Only frequencies between 5–9 kilocycles are passed by a 110-kilocycle transmitting low-pass filter 18 to radio transmitter 10, whose output is coupled to a directive antenna 9. Transmitter 10 may include a radio frequency oscillator generating a carrier frequency in the microwave region.

In reception, radio-frequency energy received on directive antenna 7 from a remote terminal station similar to Fig. 1 is impressed on radio receiver 11, which in turn derives therefrom a 5–9 kilocycle channel No. 1 signal, a 10–14 kilocycle channel No. 2 signal, etc. These signals are applied to and passed by a 110-kilocycle receiving low-pass filter 19 to a receiving mixer 20 which also receives the output of the 205-kilocycle oscillator 17. The output of mixer 20 includes a signal having frequency components between 196 and 200 kilocycles, which results from the 5–9 kilocycle channel No. 1 signal. The 196–200 kilocycle energy is passed by a receiving band-pass filter 21 to a demodulator 22. The demodulator 22, being also receptive to the output of 200-kilocycle oscillator 13, produces an audio-frequency signal in the range between 200 and 4,000 cycles, which is applied to a speaker. It should be noted that while frequencies other than those between 5 and 9 kilocycles in the output of radio receiver 11 can get through low-pass filter 19 to mixer 20, these other frequencies will be translated in mixer 20 to frequencies which cannot get through the 196–200 kilocycle band-pass filter 21 to demodulator 22. Therefore, demodulator 22 and the speaker respond only to signals which are in the 5–9 kilocycle range in the output of radio receiver 11.

A second transmit-receive channel equipment, No. 2, is also connected to the common radio transmitter 10 and common radio receiver 11. The equipment for channel 2 is identical with that for channel 1, described above, except that its second oscillator 25 has a frequency of 210 kilocycles, compared with a frequency of 205 kilocycles for oscillator 17. As a result, the frequencies passed by transmitting low-pass filter 18′ are between 10 and 14 kilocycles. Similarly, demodulator 22′ and speaker 23′ are receptive only to signals which, in the output of radio receiver 11, fall in the four kilocycle range between 10 and 14 kilocycles. Additional channel equipments are all the same, except that each has a second oscillator with a frequency displaced by an amount such as the five-kilocycle separation of the present example. The twentieth channel equipment shown in Fig. 1 has a second oscillator having an output frequency of 300 kilocycles. The output of transmitting low-pass filter 18″ is 100–104 kilocycles; and demodulator 22″ and speaker 23″ are receptive only to signals which, in the output of radio receiver 11, fall between 100 and 104 kilocycles.

It is thus far apparent that according to the teachings of this invention, channeling equipments are provided for performing translations between a plurality of audio-frequency signals and a composite signal wherein the intelligence of each of the audio signals is carried by a band of frequencies separated from the others. It is further apparent that the transmit-receive equipment for each channel is identical to the equipment for every other channel, except for the output frequency of one of the oscillators.

Figure 2:
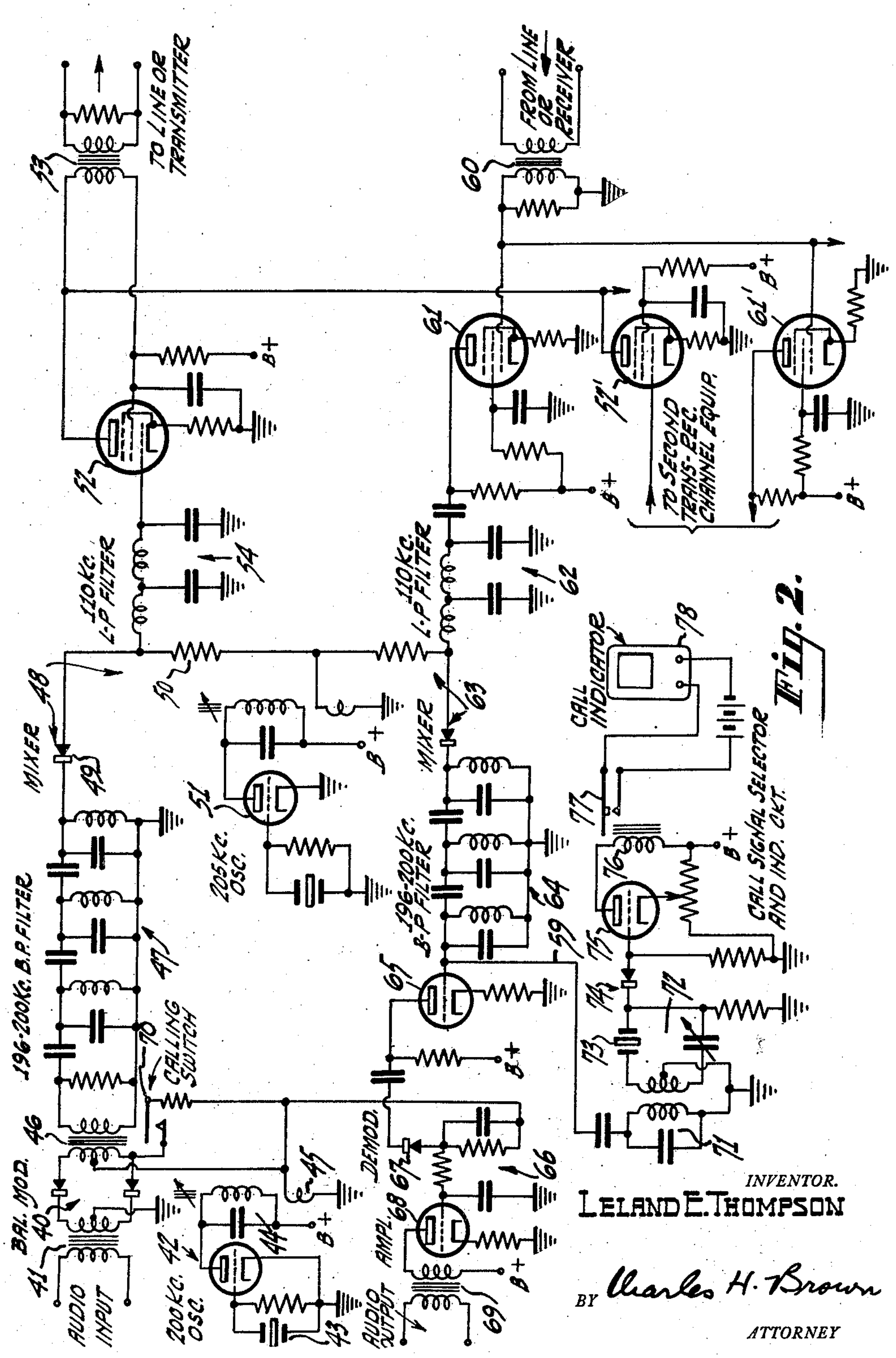
Fig. 2 is a circuit diagram of one transmit-receive channel equipment which may be used in the system of Fig. 1.

Reference will now be made to Fig. 2 for a description of a transmit-receive channel equipment circuit corresponding to a portion of the block diagram of Fig. 1. An audio-frequency signal is applied to a conventional balanced modulator 40 in push-pull relation through a transformer 41. The output of a 200-kilocycle crystal-controlled vacuum tube oscillator 42 is also applied to modulator 40, but in push-push relation, as a result of which the 200-kilocycle component is suppressed in the output of the modulator. Oscillator 42 has a crystal 43 in its grid circuit and has a tank circuit 44 with slug tuning means for the inductor. Coupling from tank circuit 44 is by means of a coil 45 with its ends effectively connected to the center taps of the transformer coils of balanced modulator 40.

The output of balanced modulator 40 is coupled by transformer 46 to a three-stage band-pass filter 47 operative to pass the lower side band having frequencies between 196 and 200 kilocycles. The output of filter 47 is applied to mixer 48 including germanium diode 49 and output resistor 50. A second crystal controlled vacuum tube oscillator 51, like oscillator 42, but having an output frequency of 205 kilocycles, is coupled to mixer 48. The difference frequencies developed across output resistor 50 of mixer 48 are passed by a 110-kilocycle low-pass filter 54 to the signal grid of a coupling vacuum tube 52. The output of tube 52 is coupled through transformer 53 to a transmission line or to a modulator of a radio transmitter 10, shown in Fig. 1.

An incoming signal from a transmission line or a radio receiver 11 (note Fig. 1) is coupled through a transformer 60 to the grid of a receiving coupling vacuum tube 61. The output of tube 61 is applied to a receiving 110-kilocycle low-pass filter 62 which is identical to the transmitting low-pass filter 54. Filter 62 passes all channel signals received, and its purpose is to discriminate against noise and interference freqencies higher than the highest channel frequency. The output of low-pass filter 62 and the output of oscillator 51 are applied to receiving mixer 63. Mixer 63 is similar to mixer 48. The difference frequencies developed in mixer 63 are passed by a conventional three-stage band-pass filter 64 designed to pass frequencies between 196 and 200 kilocycles. Receiving band-pass filter 64 substantially the same as transmitting band-pass filter 47. The signal is then applied to the grid of an isolating and amplifying vacuum tube 65; and the output of tube 65, together with the output of oscillator 42, is applied to demodulator 66 having a germanium diode 67. The resulting audio signal from demodulator 66 is applied to the grid of an audio amplifier vacuum tube 68, the output of which is coupled through an audio transformer 69 to a utilization device, such as a loudspeaker.

What has been described above in connection with Fig. 2 is a single transmit-receive channel equipment. Other similar transmit-receive channel equipments for the same terminal are connected to the primary of transformer 53 and the secondary of transformer 60 each through coupling tubes such as those represented at 52′ and 61′.

Reference will now be made to means for transmitting and receiving call signals. A call signal switch 70 is connected in a manner such as to short-circuit a part of the primary coil of transformer 46. When this is done, balanced modulator 40 is unbalanced and the oscillator frequency of 200 kilocycles from oscillator 42 is transmitted through band-pass filter 47 to mixer 48. There the 200-kilocycle signal heterodynes with the 205-kilocycle signal from oscillator 51 to produce a 5-kilocycle beat which is passed through low-pass filter 54, coupling tube 52 and transformer 53 to the transmission line or radio transmitter. When the transmitted wave is received at the remote location, the 5-kilocycle signal is derived therefrom and passed through transformer 60, coupling tube 61 and low-pass filter 62 to mixer 63 where it is heterodyned with the output of oscillator 51 to produce a difference frequency of 200 kilocycles which passes through band-pass filter 64. The 200-kilocycle signal is then applied by wire 59 to a parallel tuned circuit 71 tuned to 200 kilocycles. This circuit is coupled with a circuit 72 tuned by crystal 73 to 200 kilocycles. The output of circuit 72 is applied to germanium diode rectifier 74, from which a direct-current signal is applied to the grid of amplifying tube 75. The output of tube 75 includes a relay coil 76 which is operative to actuate relay contacts 77 and thereby energize a call indicator 78, such as a buzzer or a light. The buzzer or light will remain operated as long as switch 70 at the remote terminal is closed.

The call signal for the first channel, just described, is transmitted and received as a 5-kilocycle tone and the intelligence of the first channel is contained in frequencies between 5 and 9 kilocycles. The call signal for the second channel, following the system herein given by way of example, is transmitted and received as a 10-kilocycle tone with the intelligence in frequencies between 10 and 14 kilocycles. In additional channels, the call frequencies are successively higher by 5-kilocycle steps.

It will be noted that the call signals for all channels are produced by mixing the 200-kilocycle output of the first oscillator with the output of the second oscillator, the frequencies of the second oscillators being different for different channels. A received call signal is mixed with the particular second oscillator frequency individual to the particular channel and the resulting difference frequency of 200 kilocycles is passed through the receiving band-pass filter of the appropriate channel to the call indicator circuit. Only the call signal intended for the particular channel will beat with the frequency of the second oscillator of that channel to produce a 200-kilocycle signal which will pass through the band-pass filter to the call indicator circuit. Since the call indicator circuits of all channels are responsive to a received signal of 200 kilocycles, the call indicator circuits in all channel equipments are identical. This permits a great economy in manufacture and maintenance compared with the prior art systems, wherein different selective filters are needed for the calling circuits in each channel.

Figure 3:
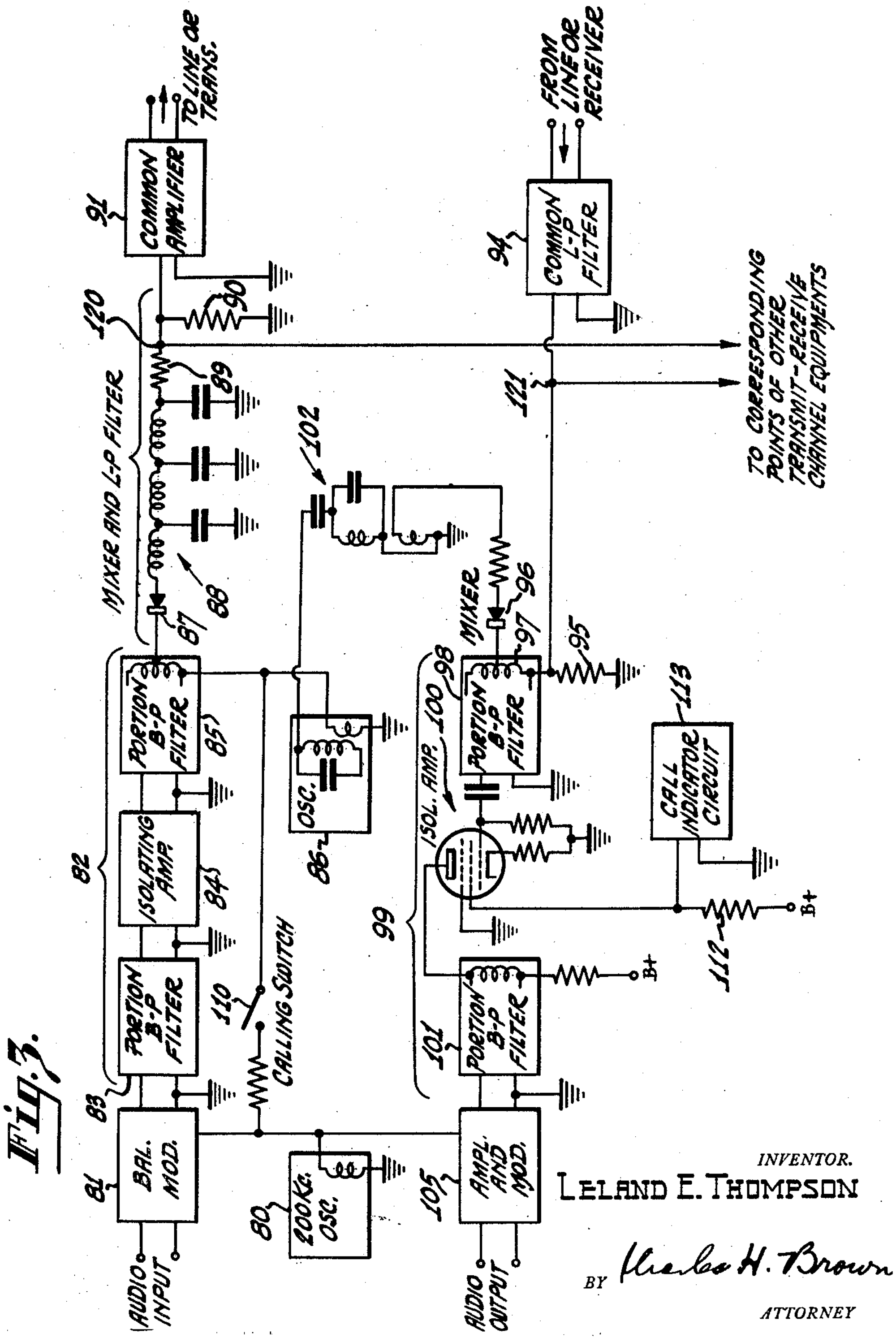
Fig. 3 is a diagram of an improved embodiment of the invention showing one transmit-receive channel equipment together with a transmitting amplifier and a receiving low-pass filter which are common to all channel equipment.

Reference will now be made to Fig. 3 for an explanation of a refinement of the channel equipment of the invention. An audio-frequency signal and the output of a 200-kilocycle oscillator 80 are applied to a balanced modulator 81. The resulting difference frequencies, in this example, are passed by a 196–200 kilocycle transmitting band-pass filter 82 consisting of a first filter portion 83, an isolating vacuum tube amplifier 84 and a second filter portion 85. By this construction, wherein the two portions of the filter are separated by an isolating amplifier, sharp cutoff characteristics can be obtained with the use of inexpensive filter coils having a lower Q than would otherwise be required.

The output of band-pass filter 82 and the output of a second oscillator 86 are applied to a germanium diode mixer 87 and 110 kilocycle low-pass filter 88, as illustrated. The mixer circuit includes the coils of filter 88, a channel isolating resistor 89 and an output load resistor 90. The difference frequencies generated in the mixer are then passed through an amplifier 91 which is common to all channel equipments and then to a line or radio transmitter for transmitting a wave to the remote terminal station of the system.

Received signals from a line or radio receiver are passed through a 110-kilocycle low-pass filter 94 which is common to all channel equipments at the terminal station, the primary purpose of the low-pass filter being to discriminate against noise and interference at frequencies higher than the highest channel frequency. The signal from low-pass filter 94 appears across a resistor 95, from which it is coupled to a germanium diode mixer 96 through a portion of coil 97 in the first portion 98 of a 196–200 kilocycle band-pass filter 99. Filter 99 also includes an isolating vacuum tube amplifier 100 and a second filter portion 101. The mixer 96 is also receptive of the output of second oscillator 86 by means of a connection from the tank circuit of oscillator 86 through a resonant circuit 102 tuned to the same frequency as oscillator 86. The difference frequencies passed by band-pass filter 99, together with the output of first oscillator

80, are applied to demodulator and audio amplifier 105 from which an audio-frequency signal is available for utilization such as by a loud speaker.

The call signal system includes a calling switch 110 coupling the output of 200-kilocycle oscillator 80 with transmitting mixer 87. This construction is superior to that shown in Fig. 2 in that the 200-kilocycle calling signal is not attenuated by the 196–200 kilocycle band-pass filter 82. Practical filters have some attenuation at the extremes of their pass bands.

A received call signal is handled very much as described in connection with Fig. 2, except that isolating amplifier 100 interposed between the two portions of band-pass filter 99 also provides some amplification of the call signal. The vacuum tube of amplifier 100 is connected in a manner well known to those skilled in the art so as to provide an amplified signal across the screen resistor 112, as well as across the plate load circuit. The isolating amplifier therefore serves the purposes of providing an advantageous take-off point for the call signal selector and indicator circuit 113 as well as providing for sharp characteristics with economy of construction in the band-pass filter 99, as described in connection with band-pass filter 82.

The circuit of Fig. 3 is superior to that of Fig. 2 in other respects. For example, the coupling from second oscillator 86 to transmitting mixer 87 and to receiving mixer 96 is such as to prevent any noticeable portion of a signal in the transmitting side of the circuit from feeding into the receiving side of the circuit, and vice versa. The manner of coupling shown also prevents the feeding of 200-kilocycle calling signal from oscillator 80 through oscillator 86 to receiving mixer 96.

Fig. 3 shows one transmit-receive channel equipment. The amplifier 91 and low-pass filter 94 are common to all transmit-receive channel equipments at a terminal station. The common transmitting and receiving points to which all channel equipments of a terminal are connected are designated 120 and 121, respectively. It will be understood that all the transmit-receive channel equipments of a terminal are identical, except for the frequency of the second oscillator 86. The frequencies of tuned coupling circuits 102 also differ, since each is tuned to the same frequency as its associated second oscillator 86 for the same channel.

Figure 4:
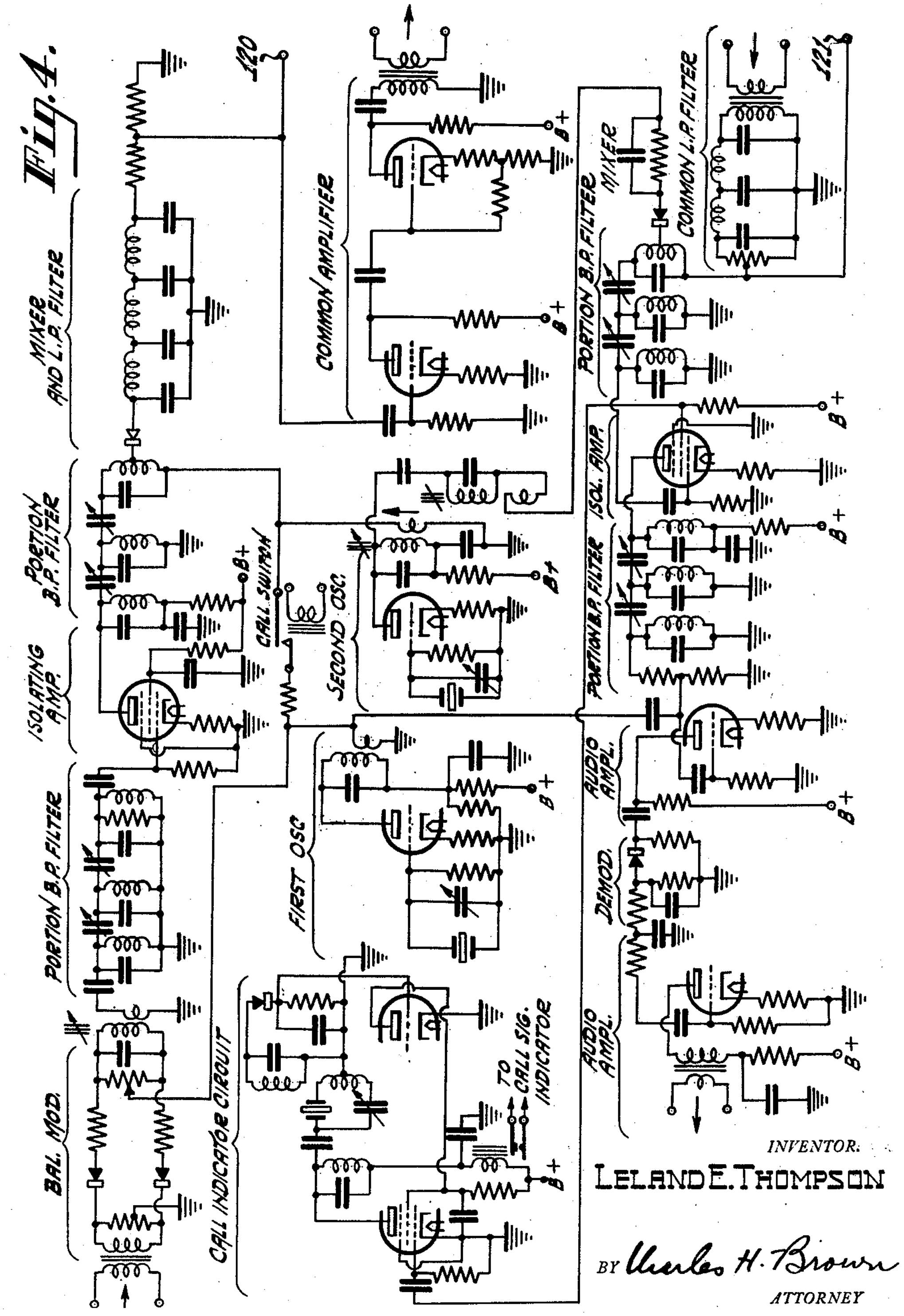
Fig. 4 is a detailed circuit diagram of the embodiment shown in simplified form in Fig. 3.

Fig. 4 shows a detailed circuit diagram corresponding to Fig. 3, the various circuits in Fig. 4 being labeled to conform with the blocks in Fig. 3. The operation of the circuit of Fig. 4 will be apparent to those skilled in the art from the description of Fig. 3, and it is therefore unnecessary to describe Fig. 4 in detail.

The transmit-receive terminal of this invention may, at first glance, appear to be more complicated and more expensive to construct than those commonly in use at the present time. While the present invention may employ a greater number of translations in a given transmit-receive channel equipment, the construction whereby all channel equipments of a terminal are alike except for the frequency of the second oscillator, and whereby great selectivity between channels is obtained with relatively inexpensive filters, is such as to provide a terminal equipment characterized by improved performance and substantial economies in manufacture and maintenance.

Having thus described the invention, what is claimed is:

1. In a channeling system for performing translations between a plurality of message signals in a given frequency range and a multiplex signal made up of channel signals separated in frequency, a plurality of transmit-receive equipments, one for each channel, each channel equipment comprising a first oscillator having a frequency higher than the highest frequency in said multiplex signal, a modulator for modulating a portion of the output of said oscillator with an input message signal, a transmitting band pass filter coupled to the modulator output for passing one of the sidebands from said modulator, the frequencies in said one sideband all being higher than the highest frequency in said multiplex signal, a second oscillator having a frequency individual to the particular channel and higher than the highest frequency in said multiplex signal, a transmitting mixer for modulating a portion of the output of said second oscillator with the output of said band pass filter, a transmitting low pass filter operative to pass the difference frequencies from said transmitting mixer, a receiving mixer receptive of a multiplex input signal and of a portion of the output of said second oscillator, a receiving band pass filter coupled to the output of said receiving mixer for passing the difference frequencies from said receiving mixer, the difference frequencies passed by said receiving band pass filter all being higher than the highest frequency in said multiplex input signal, and a demodulator receptive of the output of said receiving band pass filter and of a portion of the output of said first oscillator for producing an output message signal, the corresponding components in each of the plurality of transmit-receive equipments, except the second oscillators, being substantially identical.

2. In a channeling system for performing translations between a plurality of message signals in a given frequency range and a multiplex signal made up of channel signals separated in frequency, a plurality of transmit-receive equipments, one for each channel, each channel equipment comprising a first oscillator having a frequency higher than the highest frequency in said multiplex signal, a modulator receptive of output energy from said oscillator and of an input message signal, a band pass filter coupled to the modulator output for passing a predetermined band of frequencies common to all equipments, a second oscillator having a frequency individual to the particular channel and higher than the highest frequency in said multiplex signal, a transmitting mixer receptive of output energy from said second oscillator and of said predetermined band of frequencies for converting said band of frequencies to a channel output signal having a frequency range assigned to the particular channel, calling switch means operative to couple a portion of the output of said first oscillator to said transmitting mixer, whereby each channel equipment has a call signal of distinctive frequency determined by the frequency of the second oscillator in that channel equipment, a receiving mixer receptive of output energy from said second oscillator and of a multiplex input signal, a band pass filter coupled to the output of said receiving mixer for passing the difference frequencies from said receiving mixer which result from the channel signal having frequencies assigned to the particular channel, call indicator circuit means coupled to the output of said receiving mixer, and a demodulator receptive of output energy from said first oscillator and of the output of said last-mentioned band pass filter for producing an output message signal.

3. In a multiplex system for performing translations between a plurality of message signals in a given frequency range and a composite signal made up of channel signals separated in frequency, a plurality of transmit-receive equipments, one for each channel, each channel equipment comprising: a first oscillator having a frequency higher than the highest channel signal frequency, a modulator, and a transmitting band-pass filter all in combination for translating an input message signal to a predetermined band of frequencies common to all equipments, said band-pass filter including first and second filter portions separated by an isolating amplifier; a second oscillator having a frequency individual to the particular channel, and a transmitting mixer in combination therewith for converting said predetermined band of frequencies to a channel output signal having a frequency range assigned to the particular channel; a receiving mixer receptive of output energy from said second oscillator and of all channel input signals of different frequency bands, a receiving band-pass filter like said transmitting band-pass filter operative to pass the difference frequencies from said receiving mixer which are the result of the channel signal having frequencies assigned to the particular channel, and a demodulator receptive of output energy from said first oscillator and of the output of said receiving band-pass filter for generating an output message signal; a common amplifier receptive of the channel output signals from all transmit-receive equipments, and a common low-pass filter through which all channel input signals are applied to the receiving mixers of all transmit-receive equipments.

4. The combination of claim 3, and in addition a call system comprising calling means for applying output energy from said first oscillator to said transmitting mixer, and a selective call indicator circuit coupled to the isolating amplifier of said receiving band-pass filter.

5. Frequency-division multiplex terminal transmitting equipment comprising transmitting means and a plurality of channel equipments each comprising a source of audio frequency signal, a first oscillator having a frequency higher than the highest frequency in the multiplex output signal made up of channel signals separated in frequency, a modulator for modulating at least a portion of the output of said oscillator with a signal from said source, a band pass filter coupled to the modulator output for passing one of the sidebands from said modulator, the frequencies in said one sideband all being higher than the highest frequency in said multiplex signal, a second oscillator having a frequency individual to the particular channel and higher than the highest frequency in said multiplex signal, a mixer receptive of at least a portion of the output of said second oscillator and the output of said band pass filter, a low pass filter operative to pass the difference frequencies from said mixer, and means for applying the output of said low pass filter to said transmitting means, the corresponding components in each of the plurality of channel equipments, except the second oscillators, being substantially identical.

6. Frequency-division multiplex terminal receiving equipment comprising receiving means and a plurality of channel equipments each comprising a first oscillator having a frequency individual to the particular channel and higher than the highest frequency in the multiplex input signal made up of channel signals separated in frequency, a mixer receptive of at least a portion of the output of said oscillator and the multiplex input signal from said receiving means, a band pass filter coupled to the mixer output for passing one of the sidebands from said mixer, the frequencies in said one sideband all being higher than the highest frequency in said multiplex signal, a second oscillator having a frequency higher than the highest frequency in said multiplex signal, and a demodulator receptive of the output of said band pass filter and of at least a portion of the output of said second oscillator for producing an output audio frequency signal, the corresponding components in each of the plurality of channel equipments, except the first oscillators, being substantially identical.

References Cited in the file of this patent

UNITED STATES PATENTS

| | | |
|---|---|---|
| 1,447,204 | Espenschied | Mar. 6, 1923 |
| 2,284,706 | Weissner et al. | June 2, 1942 |